US012546154B2

(12) United States Patent
Kornish et al.

(10) Patent No.: US 12,546,154 B2
(45) Date of Patent: Feb. 10, 2026

(54) STABILIZATION ROLLER BRACKET FOR LONG ROLLER STEMS OF A MOVABLE BARRIER

(71) Applicant: Overhead Door Corporation, Lewisville, TX (US)

(72) Inventors: Dwayne J. Kornish, Navarre, TX (US); Danny L Preising, Jr., Massillon, OH (US)

(73) Assignee: Overhead Door Corporation, Lewisville, TX (US)

( * ) Notice: Subject to any disclaimer, the term of this patent is extended or adjusted under 35 U.S.C. 154(b) by 419 days.

(21) Appl. No.: 18/075,227

(22) Filed: Dec. 5, 2022

(65) Prior Publication Data

US 2024/0183206 A1 Jun. 6, 2024

(51) Int. Cl.
*E05D 15/26* (2006.01)
*E05D 13/00* (2006.01)

(52) U.S. Cl.
CPC ........... *E05D 13/00* (2013.01); *E05D 15/262* (2013.01)

(58) Field of Classification Search
CPC ..... E05D 15/242; E05D 15/165; E05D 13/00; E05D 15/262; E05Y 2900/106
See application file for complete search history.

(56) References Cited

U.S. PATENT DOCUMENTS 2,090,146 A * 8/1937 Pixley .................. E05D 15/248 16/104
2,525,309 A * 10/1950 Norberg ................ E05D 15/242 16/104
2,877,843 A * 3/1959 Stroup .................. E05D 15/165 16/98
3,176,757 A * 4/1965 Lomaz .................... E05D 15/24 160/40
3,447,192 A * 6/1969 Pemberton ............ E05D 15/242 16/104
5,058,236 A * 10/1991 Henson ................. E05D 7/0027 16/248
5,235,724 A 8/1993 Perrin
6,098,697 A * 8/2000 Krupke ................. E05D 15/242 160/229.1
6,112,799 A * 9/2000 Mullet .................... E05D 15/24 160/236
6,185,783 B1 2/2001 Carpinella
(Continued)

OTHER PUBLICATIONS

Airlift Doors, Inc., Alaska Polycarbonate Door Product Catalog, dated before Aug. 16, 2022, 64 pages.
(Continued)

*Primary Examiner* — Abe Massad
(74) *Attorney, Agent, or Firm* — Haynes and Boone, LLP

(57) ABSTRACT

A stabilization roller bracket is positioned adjacent to a hinge and supplements a hinge in coupling a roller to a movable barrier. The stabilization roller bracket includes a base configured to be coupled to an inner surface of the movable barrier. The base includes a main body and a frangible portion. The stabilization roller bracket also includes at least one wall extending from the base and including a plurality of stem-receiving holes, each of the plurality of stem-receiving holes spaced a different distance from the base and configured to receive a portion of a stem of a roller for the movable barrier and space the roller from the inner surface of the movable barrier.

19 Claims, 6 Drawing Sheets

(56) References Cited

U.S. PATENT DOCUMENTS

| | | | | |
|---|---|---|---|---|
| 6,463,988 | B1 * | 10/2002 | Mullet | E05D 15/165<br>160/209 |
| 7,299,853 | B2 * | 11/2007 | Brown | E06B 3/485<br>160/232 |
| 7,874,342 | B2 * | 1/2011 | Mullet | E05D 15/165<br>160/229.1 |
| 8,813,309 | B2 * | 8/2014 | Friesen | E05D 15/242<br>16/DIG. 1 |
| 9,115,523 | B2 | 8/2015 | Friesen | |
| 9,212,511 | B2 | 12/2015 | Mortier | |
| 9,296,280 | B2 | 3/2016 | Ehrlich | |
| 2005/0251958 | A1 | 11/2005 | Coblentz | |
| 2005/0273976 | A1 | 12/2005 | Sarver | |
| 2006/0080806 | A1 | 4/2006 | Johnson | |
| 2024/0328244 | A1 * | 10/2024 | Soler | E05D 15/22 |

OTHER PUBLICATIONS

Finishline Garage Doors, photographs of garage door taken before Aug. 16, 2022, 1 page.

* cited by examiner

STABILIZATION ROLLER BRACKET FOR LONG ROLLER STEMS OF A MOVABLE BARRIER

TECHNICAL FIELD

The present disclosure relates generally to the field of movable barriers. In particular, a stabilization roller bracket includes multiple holes configured receive a distal portion of a long roller stem and space the roller from the movable barrier by different distances.

BACKGROUND

Movable barriers, such as upward-acting sectional or single panel garage doors, residential and commercial rollup doors, and slidable and swingable gates, are used to alternatively allow and restrict entry to building structures and property. An upward-acting slidable barrier typically includes rollers positioned on either side of the barrier which roll along a track. Each roller is secured to the barrier with a roller bracket. In a closed position, the barrier is positioned vertically and the track is angled from the barrier extending upward. In this way, the distance between the barrier and the track increases with vertical height and the roller brackets are selected to maintain the angle between the track and the barrier in a closed position.

Upward-acting sectional garage doors typically include several horizontal sections. Each horizontal section is attached to one another via two hinges, with one hinge on either side. These hinges serve dual purposes of rotatably affixing neighboring sections to one another as well as housing a roller which attaches the movable barrier to tracks on either side of the door. To house the roller, each hinge includes a roller holder, which may be a cylindrical component through which the roller stem is slid allowing the roller head to be positioned in one of the tracks. To secure a hinge to a section of a movable barrier, a steel endcap is typically positioned between the hinge and the movable barrier to increase the strength of connection.

In some implementations, long rollers may be used to attach a garage door to the tracks. When long rollers are used, four hinges may be used to affix neighboring sections to one another, with two hinges on either side. The two hinges may be positioned next to one another and may both house the long roller stem. The roller stem extends completely through the roller holder of the first hinge and into the roller holder of the second hinge. In addition, when long rollers are used, double wide endcaps are also used to extend between both hinges and the movable barrier. In that regard, when long rollers are used to affix garage doors of greater weight to corresponding tracks, additional hardware is required, which increases cost and weight of the garage door. In addition, if transparent or semi-transparent panels, sometimes referred to as lites, are included within the sections of the garage door, double wide endcaps and second hinges necessary to accommodate long roller stems often interfere with or overlap the lites. As a result, portions of the double wide endcaps and hinges must be cut, which is a labor-intensive process and unnecessarily wastes material.

SUMMARY

In an example aspect, the present disclosure is directed to a stabilization roller bracket for supplementing a hinge in coupling a roller to a movable barrier. The stabilization roller bracket includes a base configured to be coupled to an inner surface of a movable barrier, the base comprising a main body and a frangible portion; a first wall extending from the base and comprising a first plurality of stem-receiving holes, each of the plurality of stem-receiving holes spaced a different distance from the base and configured to: receive a portion of a stem of a roller of the movable barrier; and space the roller from the inner surface of the movable barrier.

In some aspects, each stem-receiving hole of the first plurality of stem-receiving holes is configured to space the roller from the inner surface of the movable barrier by a different distance. In some aspects, the distance which each stem-receiving hole of the first plurality of stem-receiving holes spaces the roller from the inner surface of the movable barrier is determined based on a vertical position of the stabilization roller bracket along the movable barrier when the movable barrier is in a closed position. In some aspects, the stabilization roller bracket further comprises a second wall comprising a second plurality of stem-receiving holes corresponding to the first plurality of stem-receiving holes and configured to receive a distal portion of the stem of the roller. In some aspects, the first wall and the second wall are perpendicular to the base of the stabilization roller bracket. In some aspects, the stabilization roller bracket may be configured to be positioned between the inner surface of the movable barrier and a fin extending horizontally along the inner surface of the movable barrier and affixed to the inner surface of the movable barrier such that a portion of the fin overlaps a portion of the base of the stabilization roller bracket. In some aspects, the base of the stabilization roller bracket further comprises a groove separating frangible portion and the main body, wherein the groove facilitates removal of the frangible portion. In some aspects, the frangible portion is removed if the movable barrier comprises a lite frame. In some aspects, the main body of the stabilization roller bracket further comprises an elongated hole allowing vertical adjustment of the stabilization roller bracket. In some aspects, one of the first plurality of stem-receiving holes is an elongated hole comprising more than one overlapping circular regions, each circular region configured to receive a distal portion of the stem of the roller and space the roller from the inner surface of the movable barrier by a different distance.

In another example aspect, a movable barrier system is provided. The movable barrier system includes a movable barrier comprising an inner surface; a roller comprising a stem; a hinge comprising an opening configured to receive a proximal region of the stem of the roller; and a first roller bracket comprising: a base configured to be coupled to the inner surface of the movable barrier; and a first wall comprising a first plurality of holes configured to receive a distal region of the stem of the roller.

In some aspects, the first roller bracket is configured to be positioned adjacent to the hinge, and wherein the movable barrier comprises sections, and the first roller bracket is shaped to attach to only one section of the movable barrier. In some aspects, each hole of the first plurality of holes is configured to space the roller from the inner surface of the movable barrier by a different distance. In some aspects, the first roller bracket further comprises a second wall comprising a second plurality of holes corresponding to the first plurality of holes and configured to receive the distal region of the stem of the roller. In some aspects, the base of the first roller bracket comprises a groove defining a main body and a frangible portion. In some aspects, the base of the first roller bracket further comprises an elongated hole allowing vertical adjustment of the first roller bracket. In some aspects, one of the first plurality of holes is an elongated hole comprising more than one overlapping circular regions, each circular region configured to receive the distal region of the stem of the roller and space the roller from the inner surface of the movable barrier by a different distance. In some aspects, the movable barrier system further includes a second roller bracket configured to be affixed to the movable barrier at a different vertical position than the first roller bracket, the second roller bracket comprising: a second wall comprising a second plurality of holes, each of the second plurality of holes configured to space the roller a different distance from the inner surface of the movable barrier than each of the holes of the first plurality of holes.

In another example aspect, a method is provided. The method includes positioning a head of a roller within a track of the movable barrier system; positioning a stem of the roller through a tube of a hinge; adjusting a vertical position of a roller bracket positioned adjacent to the hinge; and positioning the stem of the roller through one of a plurality of holes within the roller bracket, such that a proximal region of the stem of the roller is positioned within the tube of the hinge and a distal region of the stem of the roller is positioned within the one of the plurality of holes.

In some aspects, the roller bracket comprises a groove configured to facilitate removal of a portion of the roller bracket, the method further comprising breaking off a portion of the roller bracket.

It is to be understood that both the foregoing general description and the following drawings and detailed description are exemplary and explanatory in nature and are intended to provide an understanding of the present disclosure without limiting the scope of the present disclosure. In that regard, additional aspects, features, and advantages of the present disclosure will be apparent to one skilled in the art from the following. One or more features of any implementation or aspect may be combinable with one or more features of other implementation or aspect.

BRIEF DESCRIPTION OF THE DRAWINGS

The accompanying drawings illustrate implementations of the systems, devices, and methods disclosed herein and together with the description, serve to explain the principles of the present disclosure.

Figure 1:
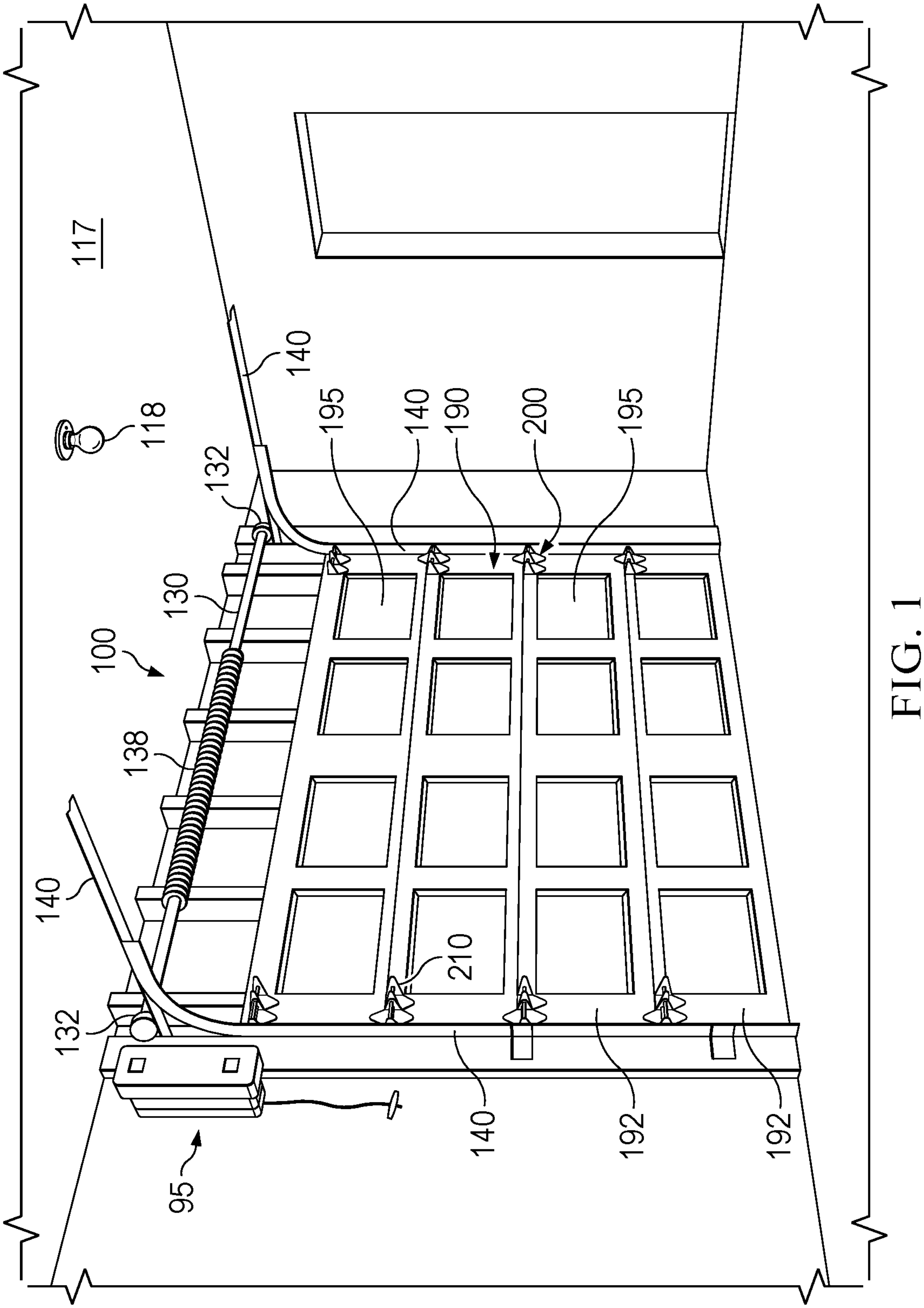
FIG. 1 is a perspective illustration of a movable barrier system, according to aspects of the present disclosure.

These Figures will be better understood by reference to the following Detailed Description.

DETAILED DESCRIPTION

For the purpose of promoting an understanding of the principles of the present disclosure, reference will now be made to the implementations illustrated in the drawings and specific language will be used to describe them. It will nevertheless be understood that no limitation of the scope of the disclosure is intended. Any alterations and further modifications to the described devices, instruments, methods, and any further application of the principles of the present disclosure are fully contemplated as would normally occur to one skilled in the art to which the disclosure relates. In addition, this disclosure describes some elements or features in detail with respect to one or more implementations or Figures, when those same elements or features appear in subsequent Figures, without such a high level of detail. It is fully contemplated that the features, components, and/or steps described with respect to one or more implementations or Figures may be combined with the features, components, and/or steps described with respect to other implementations or Figures of the present disclosure. For simplicity, in some instances the same or similar reference numbers are used throughout the drawings to refer to the same or like parts.

In some aspects, the present disclosure relates to a stabilization roller bracket which may be used in place of a second hinge to support the stem of a long roller. The stabilization roller bracket includes a main body with one or more walls extending from either side of the main body in a perpendicular direction. Each of these one or more walls includes may include an identical set of holes. The holes are sized and shaped to receive the distal portion of a long roller stem. The stabilization roller bracket may be attachable to the inner surface of the movable barrier adjacent to, and inside of, the hinges on the outside edge of each section of the movable barrier. In this position, a roller may be positioned through the roller holder of the hinge and then through at least one corresponding hole of the stabilization roller bracket (one hole in each wall). The holes are positioned within the walls of the stabilization roller bracket so as to space the roller from the movable barrier by a different amount. For example, the roller holders of the hinges may space rollers from the movable barriers by a different amount. For example, a hinge connecting the lowest section to the section above it will space the roller from the movable barrier by a minimum amount, the next hinge moving up the garage door will space the roller by a slightly greater amount, and so on. The holes of the stabilization roller bracket may be positioned based on these same distances. As a result, the same stabilization roller bracket may be used in conjunction with hinges of multiple different types by inserting the roller in a different set of holes. The stabilization roller bracket also may be sized and shaped to easily accommodate for lites within sections of the movable barrier with a frangible portion that may be easily removed. The stabilization roller bracket also may accommodate for lites because it is only affixed to one section and does not include a hinge and does not require a double wide endcap. As a result, aspects of the present disclosure may provide a more efficient and cost-effective solution for supporting long rollers in upward acting sectional garage doors. Additional aspects of the present disclosure will be described in more detail with reference to the Figures below.

FIG. 1 is a perspective illustration of a movable barrier system 100, according to aspects of the present disclosure. In this example, a movable barrier 190 is an upward acting garage door. In some examples, the movable barrier may be a sectional-type garage door. FIG. 1 illustrates the movable barrier 190 and a barrier operator 95. In some implementations, the movable barrier 190 may include multiple sections 192 and multiple panels 195. In some implementations, the sections 192 make up the movable barrier 190. For example, in FIG. 1, the movable barrier 190 may include four sections 192 stacked vertically. The panels 195 may be positioned within the sections 192 and may be transparent or non-transparent.

In some implementations, the movable barrier system 100 described herein may be referred to as a barrier system, a door system, a garage door system, a gate system, or any other similar term. In some implementations, the movable barrier 190 may be referred to as a barrier, a door, a garage door, a sectional garage door, an upward acting garage door, a gate, a movable gate, a sliding gate, or any other similar term. In some implementations, the barrier operator 95 may alternatively be referred to as an operator, a door operator, a garage door operator, a gate operator, an opener, a door opener, a garage door opener, a gate opener, a control system, or any other similar term. In some implementations, the light fixture 118 may be referred to as a light, a light system, or any other similar term.

FIG. 1 shows that the movable barrier 190 provides access to a space or a room having a ceiling 117 and the light fixture 118 that is spaced from the barrier operator 95. The movable barrier 190 may provide selective access to the space. The barrier operator 95 may be any suitable type of barrier operator. For example, in some implementations, the barrier operator 95 may be a jackshaft operator. In other implementations, the barrier operator 95 may be a direct drive wall or ceiling mounted operator, a belt driven operator, a chain driven operator, a screw drive operator, a trolley operator, a carriage operator, or any other type of barrier operator. The barrier operator 95 may include any suitable components. As shown in FIG. 1, the barrier operator 95 may be disposed adjacent the movable barrier 190. For example, in the implementation shown, the barrier operator 95 may be positioned on the same wall as the opening covered by the movable barrier 190. However, the barrier operator 95 may be positioned at any other location within the room shown in FIG. 1. For example, the barrier operator 95 may be affixed to the ceiling 117. In some implementations, the barrier operator 95 may be positioned on a different wall of the room or on the floor of the room. In some implementations, particularly in an implementation in which the barrier operator 95 is affixed or otherwise positioned on the ceiling 117 of the room, the light fixture 118 may be attached to, or a part of, the barrier operator 95.

Any suitable structures or components may be implemented to facilitate movement of the movable barrier 190 between a closed position and an open position. In the example shown in FIG. 1, the movable barrier 190 may be moved along one or more tracks 140. Additionally shown in FIG. 1 is a shaft 130, cable drums 132, and a torsion spring 138.

FIG. 1 illustrates the movable barrier 190 as an upward acting sectional door being movable between open and closed positions along the tracks 140. The tracks 140 may be affixed to either side of the opening of the movable barrier 190. In some implementations, the tracks 140 may be affixed to the wall of the room shown in FIG. 1 and/or the ceiling 117. In some implementations, the movable barrier 190 may include one or more rolling or sliding components on either side sized and shaped to fit within and move in a longitudinal direction along the tracks 140. The rolling or sliding components may be affixed to the brackets positioned on either side of the movable barrier 190.

Components of the movable barrier system 100 shown in FIG. 1 may include any other suitable components. For example, the movable barrier system 100 may include rollers positioned on the movable barrier 190 or the tracks 140. The system 100 may include sensors, such as safety sensors configured to detect the presence or motion of an object or person, seals positioned along any portion of the movable barrier 190 or the corresponding opening, tracks, cables, or tube shafts. The system may include extension springs to further reduce necessary rotational force of a motor, a motor rail, belts, motor head, motor arms, lift handles for manual operation, emergency release ropes, or any other suitable components.

The movable barrier 190 may include any number of sections 192. For example, the movable barrier 190 may include a number of sections 192 greater or less than those shown in FIG. 1. At least two hinges 200 may rotatably affix sections 192 to one another. These hinges 200 may include roller tubes configured to receive the stem of a roller positioned within either of the tracks 140. A stabilization roller bracket 210 may be positioned adjacent to each of the hinges 200. These stabilization roller brackets 210 may also include a plurality of stem-receiving holes configured to receive the stem of the same roller, as described in more detail hereafter.

Figure 2A:
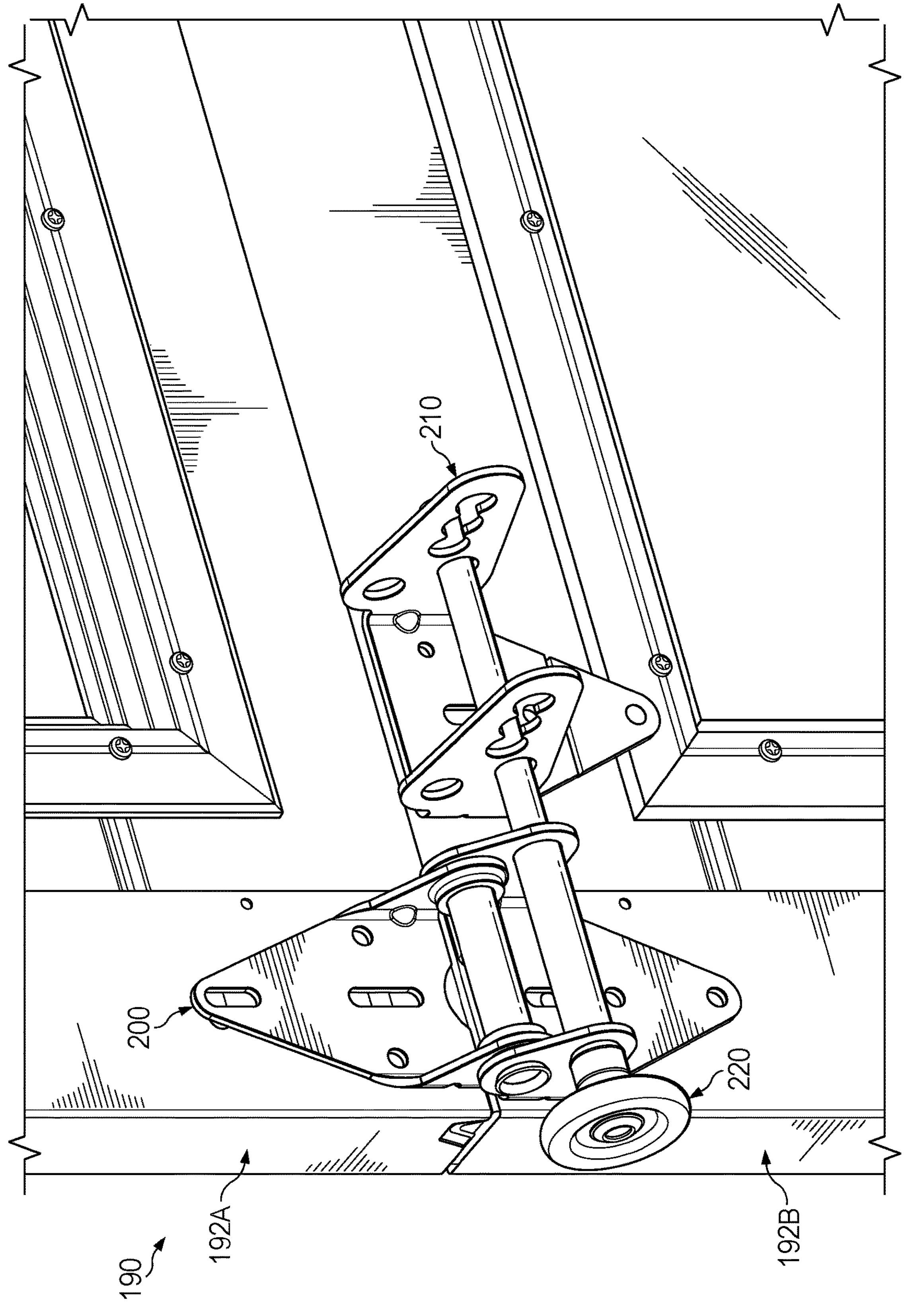
FIG. 2A is a perspective view of a portion of a movable barrier in a closed position including a hinge and a stabilization roller bracket, according to aspects of the present disclosure.

FIG. 2A is a perspective view of a portion of the movable barrier 190 in a closed position including a hinge 200 and a stabilization roller bracket 210, according to aspects of the present disclosure. The movable barrier 190 shown in FIG. 2A include sections 192A and 192B.

The sections 192A and 192B are affixed to one another via the hinge 200 shown. The hinge 200 allows rotation of the sections 192A and 192*b* about a hinge axis of the hinge 200 as the movable barrier 190 moves upward or downward along the tracks 140 between a closed position and an open position (e.g., from a closed position to an open position and/or from an open position to a closed position). Additional details of the hinge 200 will be described in greater detail with reference to FIG. 3.

As shown in FIG. 2A, the stabilization roller bracket 210 is positioned adjacent to the hinge 200. For example, the hinge 200 may be positioned at the outermost side of the movable barrier 190. The stabilization roller bracket 210 may be positioned adjacent to the hinge 200 at an inner side of the hinge 200, as shown.

FIG. 2A additionally shows a roller 220. The roller 220 may be referred to as a long roller because the stem of the roller 220 is long enough to be positioned within a roller holder of the hinge 200 as well as through a corresponding set of holes of the stabilization roller bracket 210, as will be described in more detail hereafter.

Figure 2B:
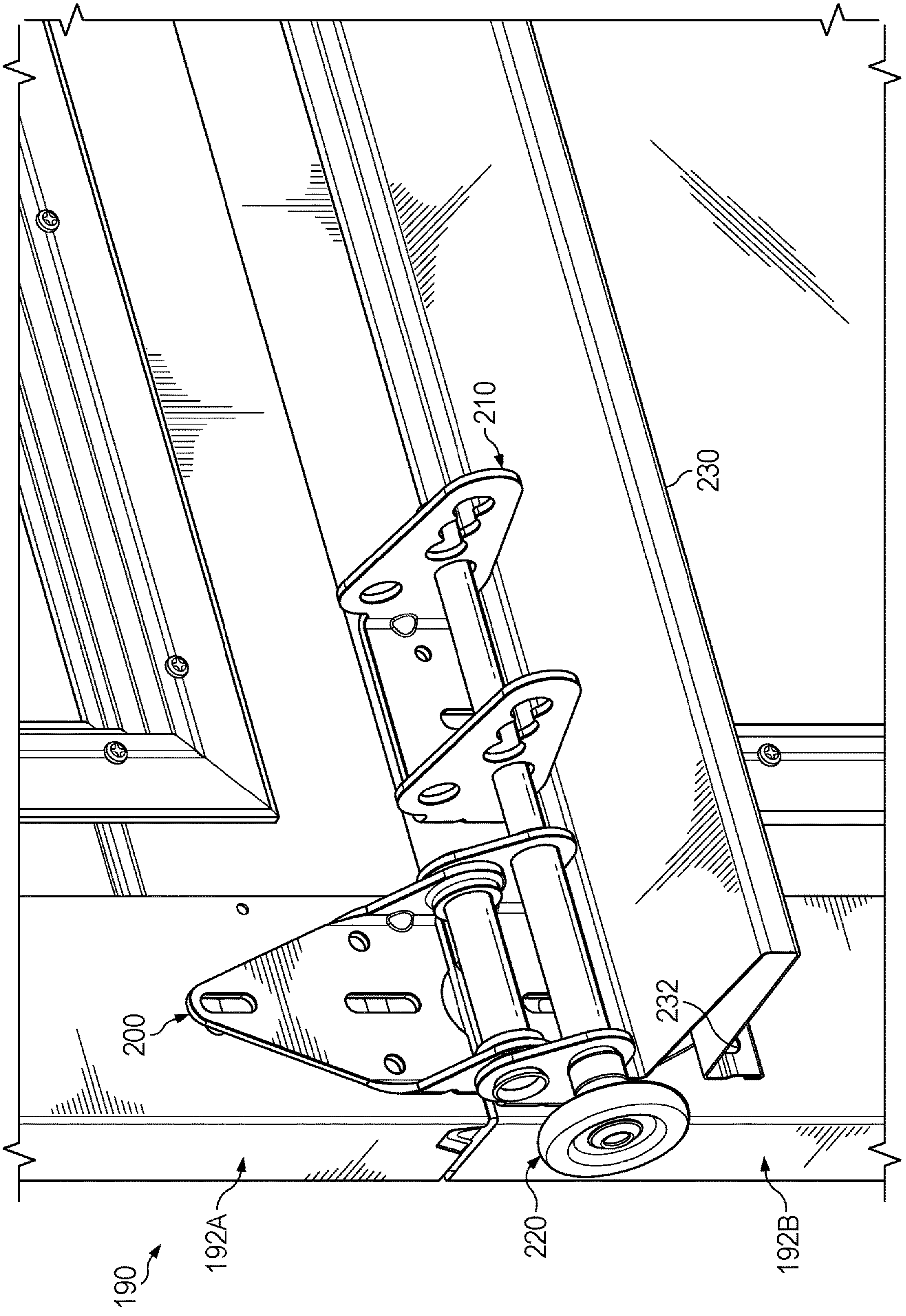
FIG. 2B is a perspective view of a portion of a movable barrier in a closed position including a hinge, a stabilization roller bracket, and a fin, according to aspects of the present disclosure.

FIG. 2B is a perspective view of a portion of the movable barrier 190 in a closed position including a hinge 200, a stabilization roller bracket 210, and a fin 230, according to aspects of the present disclosure.

The fin 230 shown in FIG. 2B may extend horizontally along the movable barrier 190 from the left side, shown, to the right side. The fin 230 may be affixed to the inner surface of the movable barrier 190, e.g., by one or more fasteners. The fin 230 may be shaped with two walls extending in a perpendicular direction from the inner surface of the movable barrier 190 and joined together a distal position all along the fin 230.

The fin 230 may provide additional strength to the movable barrier 190. In particular, when the movable barrier 190 is in an open position along the upper track 140, the weight of the movable barrier 190 is suspended between the tracks 140 and transferred through the rollers 220 on either side of each section 192. In this position, the sections 192 of the movable barrier 190 may be prone to bending or breaking at a central region of the sections 192 due to the weight of the movable barrier 190, including the various hardware affixed to the movable barrier. The fin 230 shown may increase the stiffness of the movable barrier 190 in the perpendicular direction of the movable barrier 190.

As shown in FIG. 2B, the fin 230 may be positioned over portions of the hinge 200 and the stabilization roller bracket 210. For example, one or more fasteners, such as screws including self-tapping screws, bolts, or any other fasteners, may be driven through one or more holes 232 of the fin 230 and through corresponding holes within the hinge 200. Similarly, fasteners may be driven through one or more holes 232 of the fin 230 and through corresponding holes within the stabilization roller bracket 210.

Figure 3:
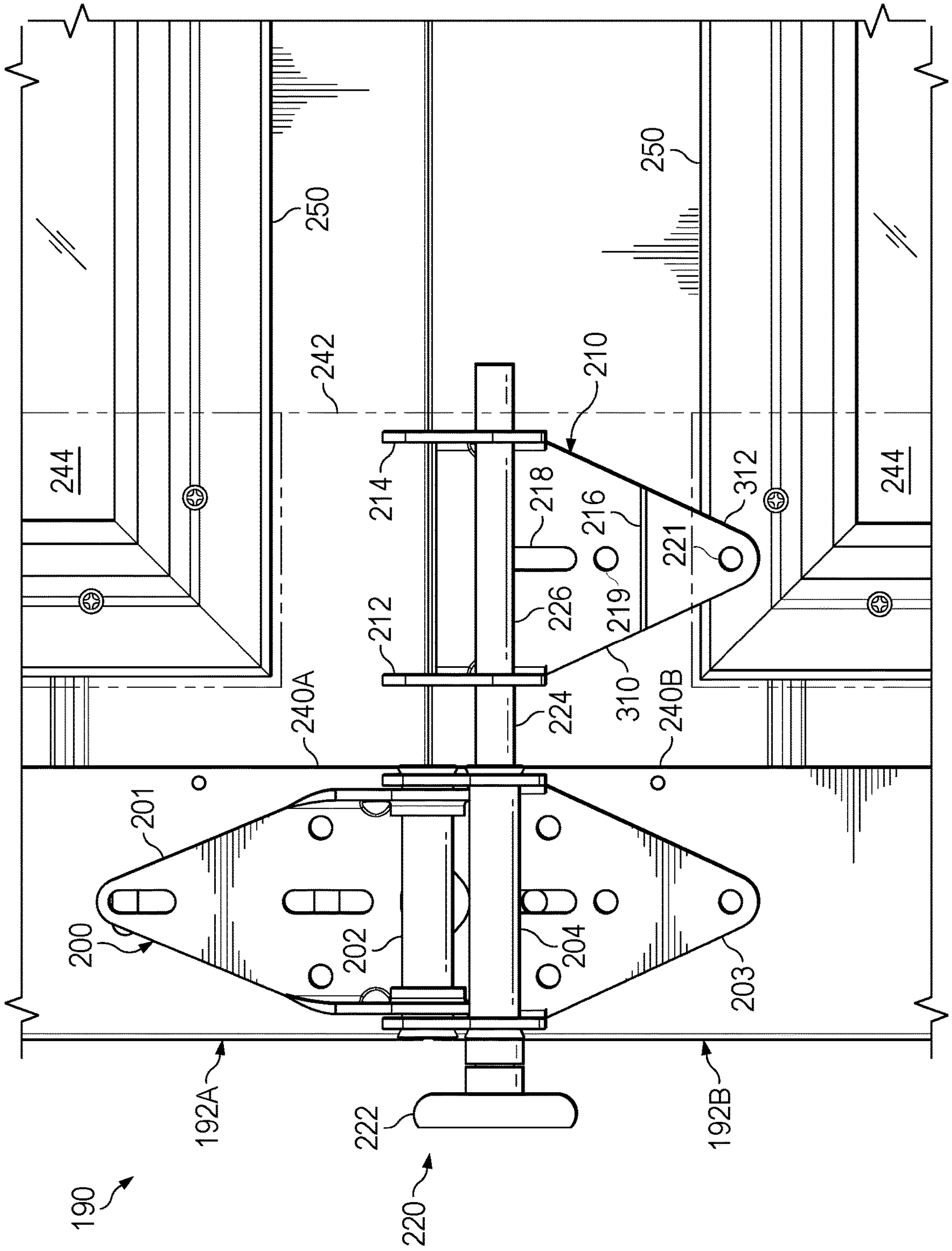
FIG. 3 is a front view of a hinge and a stabilization roller bracket, according to aspects of the present disclosure.

FIG. 3 is a front view of a hinge 200 and a stabilization roller bracket 210, according to aspects of the present disclosure. The hinge 200 includes an upper bracket 201 and a lower bracket 203. The lower bracket 203 includes a cylindrical structure 202. The cylindrical structure 202 may extend between two walls of the lower bracket 203, the two walls arranged perpendicular to the movable barrier 190. As shown in FIG. 3, the upper bracket 201 also includes two walls extending in a perpendicular direction from the movable barrier, each wall including holes configured to receive the cylindrical structure 202. In this orientation, the upper bracket 201 and the lower bracket 203 may form a hinge affixing the section 192A to the section 192B and allowing the section 192A and the section 192B to rotate.

In some aspects, the lower bracket 203 may additionally include a roller holder 204. The roller holder 204 may be a cylindrical structure sized and shaped to receive a stem of the roller 220 through a central lumen of the roller holder 204, as shown in FIG. 3.

In addition, the upper bracket 201 may include one or more holes. The one or more holes may be configured to receive fasteners to affix the upper bracket 201 to the section 192A of the movable barrier 190. The lower bracket 203 may also include one or more holes configured to receive similar fasteners to affix the lower bracket 203 to the section 192B of the movable barrier 190.

It is additionally noted that while the upper bracket 201 and the lower bracket 203 shown in FIG. 3 serve as a hinge to rotatably couple the sections 192A and 192B, any suitable hinge may be used at the same location as the hinge 200 shown in FIG. 3.

FIG. 3 additionally illustrates an endcap 240A positioned along the outer side of the section 192A. Similarly, an endcap 240B is positioned along the outer side of the section 192B. The endcaps 240A and 240B may be constructed of steel, or any other material of similar strength. In some aspects, the sections 192A and 192B may be constructed of a different material than the endcaps 240A and 240B, such as wood, fiberglass, or aluminum. In that regard, the endcaps 240A and 240B may provide a stronger coupling of the hinge 200 to the sections 192A and 192B. For example, fasteners may be driven through the holes of the upper bracket 201 and the holes of the lower bracket 203, through the endcaps 240A and 240B and into the material of the sections 192A and 192B.

As shown in FIG. 3, the roller 220 may be a long roller. For the purposes of the present disclosure, a long roller may be a roller with a stem that is long enough to extend through two hinges (e.g., the hinge 200 shown in FIG. 3) placed side-by-side. In that regard, when a long roller is installed within the roller holder 204 of the hinge 200, the stem of the long roller extend past the line 242 shown.

In some aspects, long rollers may be used in conjunction with two hinges. For example, in some implementations, the hinge 200 may be positioned as shown in FIG. 3 with an additional hinge positioned adjacent to the hinge 200 (e.g., at the location of the stabilization roller bracket 210. In that regard, a long roller may extend through the roller holder 204 as well as an additional roller holder of the additional adjacent hinge. Long rollers and two adjacent hinges may be used in this way to provide additional strength for heavy duty doors. For example, if the movable barrier is barrier of greater weight (e.g., a movable barrier constructed of heavy material, a movable barrier of great width, a movable barrier of great height, etc.), the use of long rollers with two adjacent hinges at each edge of the sections of the movable barrier increases the overall strength of movable barrier. For example, when the movable barrier is in an open position, the movable barrier may be suspended horizontally (e.g., parallel to the floor). In this position, if the weight of the movable barrier is too large, standard length rollers may be prone to bend or fail under stress. However, long rollers within two adjacent hinges resist bending or failure under greater loads, thus increasing the strength and reliability of the movable barrier.

Instead of a second hinge being positioned next to the hinge 200 shown in FIG. 3, aspects of the present disclosure include the use of the stabilization roller bracket 210 positioned next to the hinge 200.

As shown in FIG. 3, the stabilization roller bracket 210 may include a main body 310 and a frangible portion 312. The main body 310 may be affixed to the movable barrier. For example, the main body 310 may include multiple holes configured to receive fasteners that, when driven through the holes and into the movable barrier, secure the main body of the stabilization roller bracket 210 to the movable barrier 190. As shown in FIG. 3, the stabilization roller bracket 210 may be affixed to the section 192B. In that regard, when the hinge 200 is used to affix two sections 192 in conjunction with the stabilization roller bracket 210, the stabilization roller bracket 210 may be affixed only to the lower section of the two sections 192 while the hinge 200 is affixed to both sections.

As shown in FIG. 3, the stabilization roller bracket 210 may include holes for receiving fasteners, such as an elongated hole 218 and a round hole 219. The elongated hole 218 may extend longitudinally along the main body 310 of the stabilization roller bracket 210. The elongated hole 218 may be of any suitable shape. The elongated hole 218 may allow a fastener to be positioned at multiple locations within the elongated hole 218. In that regard, the elongated hole 218 may allow for adjustment of the position of the stabilization roller bracket 210 after installation. For example, if the stabilization roller bracket is installed but does not align with hinge 200, the fastener within the elongated hole 218 may be removed, or partially removed, the stabilization roller bracket 210 may be slid up or down vertically along the movable barrier 190, and the fastener may be reinstalled. Once positioned, a fastener may be driven through the round hole 219 to prevent further movement of the stabilization roller bracket 210.

The frangible portion 312 of the stabilization roller bracket 210 is also shown in FIG. 3. The frangible portion 312 includes at least one fastener hole 221 that may be utilized to provide additional securement to the barrier and stabilization to the stabilization roller bracket 210 in some instances. The frangible portion 312 may be separated from the main body 310 of the stabilization roller bracket 210 by a groove 216 extending horizontally across the stabilization roller bracket 210. The frangible portion 312 may be a portion of the stabilization roller bracket 210 which may be removable by breaking the frangible portion 312 from the rest of the stabilization roller bracket 210. In that regard, the groove 216 may be of decreased thickness compared to the rest of the stabilization roller bracket 210 such that the frangible portion may be separated from the rest of the stabilization roller bracket 210 at the groove 216.

As shown in FIG. 3, the frangible portion 312 may be removed from the stabilization roller bracket 210 when a lite 250 is positioned within the section 192B. In some aspects, the lite 250 may be a window, such as a transparent or semi-transparent panel. The lite 250 may include a frame positioned around a transparent or semi-transparent panel. In some aspects, the lite 250 may be a panel similar to the panels 195 shown and described with reference to FIG. 1. When such a lite 250 is positioned within the section 192B, the frangible portion 312 of the stabilization roller bracket 210 may overlap the frame of the lite 250. In such a situation, an installer of the movable barrier may break off the frangible portion 312 so the stabilization roller bracket 210 does not overlap the lite 250.

The stabilization roller bracket 210 additionally includes a wall 212 and a wall 214 extending in a perpendicular direction from the movable barrier 190 from either side of the main body 310 of the stabilization roller bracket 210. Aspects of the walls 212 and 214 of the stabilization roller bracket 210 are now described with reference to FIGS. 4 and 5.

Figure 4:
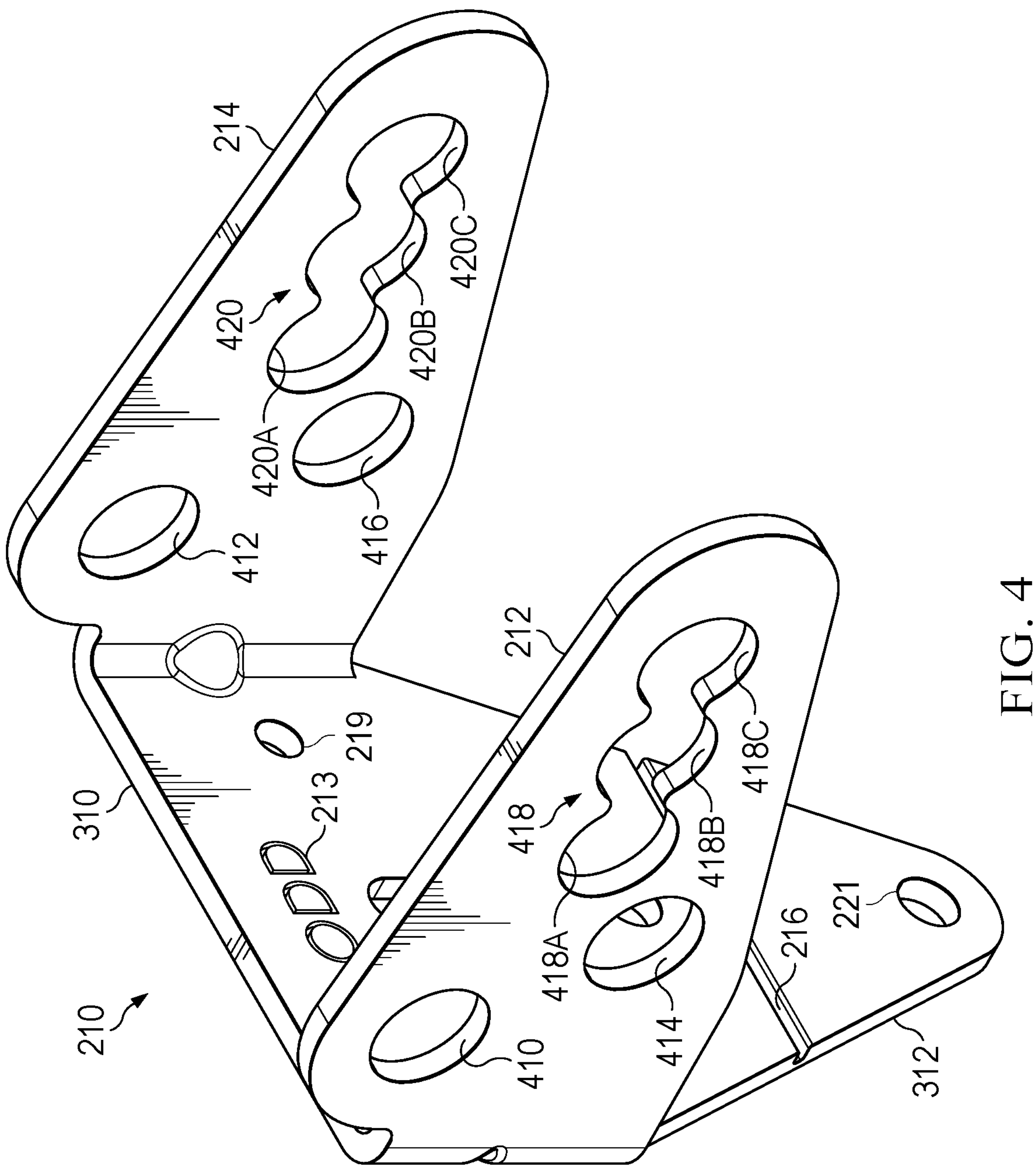
FIG. 4 is a perspective view of a stabilization roller bracket, according to aspects of the present disclosure.

FIG. 4 is a perspective view of the stabilization roller bracket 210, according to aspects of the present disclosure. As shown, the wall 212 of the stabilization roller bracket 210 may include a plurality of holes. This plurality of holes includes a hole 410, a hole 414, and a hole 418. In some aspects, the hole 418 may be referred to as a compound hole, a joint hole, an elongated hole, or any other suitable term. In that regard, the hole 418 may include multiple overlapping circular regions, including circular regions 418*a*, 418*b*, and 418*c*. Each of the circular regions 418*a*, 418*b*, and 418*c* may be sized and shaped similar to the holes 410 and 414.

The wall 214 of the stabilization roller bracket includes a corresponding set of holes, including holes 412, 416, and 420. Like the hole 418, the hole 420 may be a compound hole including multiple circular regions, including circular regions 420*a*, 420*b*, and 420*c*. The holes of the wall 214 may correspond to the holes of the wall 212 such that the sizes, shapes, and positions of the holes of the wall 214 are symmetrical with the holes of the wall 212.

Referring to FIG. 3, each of the holes of the walls 212 and 214 may be sized, shaped, and positioned to receive the stem of the roller 220. For example, when the roller 220 is installed, a head 222 of the roller 220 may be positioned to the outside of the side edge of the movable barrier 190. The head 222 of the roller 220 may be positioned within a track (e.g., either of the tracks 140 shown in FIG. 1). A proximal portion of the stem may be positioned within the roller holder 204 of the hinge 200. A distal portion 226 of the stem of the roller 220 may be positioned within the holes of the walls 212 and 214. In an installed configuration, a central region 224 of the stem of the roller 220 may be positioned between the hinge 200 and the stabilization roller bracket 210 as also shown.

Referring again to FIG. 4, a roller stem which is received by the hole 410 of the wall 212 may be received by the hole 412 of the wall 214 such that the roller 220 is positioned parallel to the movable barrier. Similarly, a roller stem received by the hole 414 may be received by the hole 416. A roller stem received within the circular region 418*a* may be received by the circular region 420*a*, a roller stem received within the circular region 418*b* may be received by the circular region 420*b*, and a roller stem received by the circular region 418*c* may be received by the circular region 420*c*.

Figure 5:
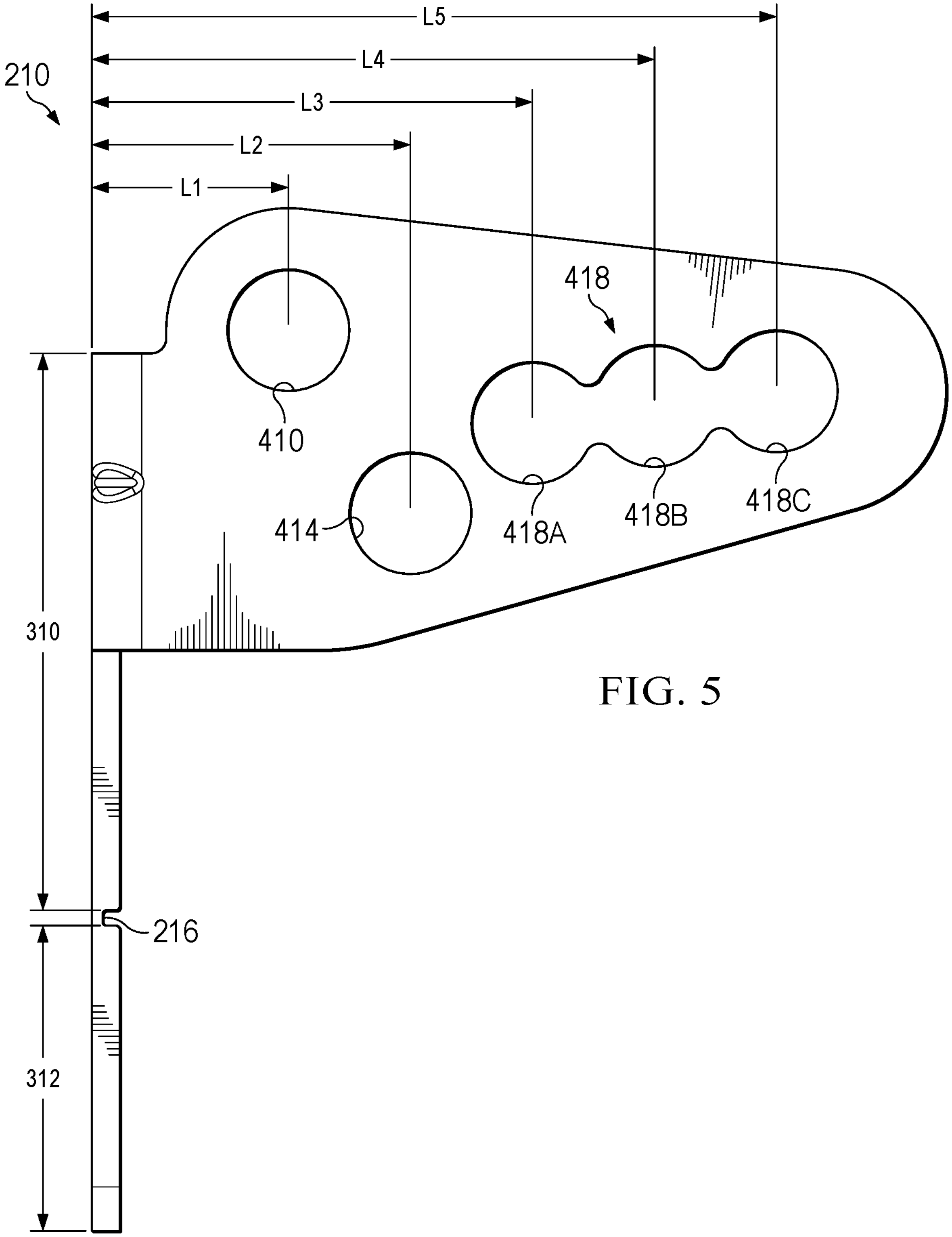
FIG. 5 is a side view of a stabilization roller bracket, according to aspects of the present disclosure.

FIG. 5 is a side view of the stabilization roller bracket 210, according to aspects of the present disclosure. As shown in FIG. 5, each of the holes configured to receive the roller stem may space the roller from the inner surface of the movable barrier by a different distance. The roller may be spaced from the inner surface of the movable barrier by different distances to account for an angle of the tracks 140 (see FIG. 1) from the movable barrier 190 positioned vertically in a closed position. In particular, when the stabilization roller bracket 210 is affixed to the movable barrier 190, the center of the hole 410 (and corresponding hole 412) is spaced from the inner surface of the movable barrier by a distance L1. In that regard, the holes 410 and 412 may be used for the bottom section 192 of the movable barrier, which may be referred to as the first section. Holes 414 and 416 space a roller from the inner surface of the movable barrier by a distance L2. Holes 414 and 416 may be used for the third section of the movable barrier. As shown, circular regions 418*a* and 420*a* may space the roller by a distance of L3 and may be used for a fifth section of the movable barrier. Circular regions 418*b* and 420*b* may space the roller by a distance of L4 and may be used for a seventh section of the movable barrier. Circular regions 418*c* and 420*c* may space the roller by a distance of L5 and may be used for a ninth section of the movable barrier.

Referring again to FIG. 4, a label 213 is imprinted on the main body 310 of the stabilization roller bracket 210. The label 213, as shown in FIG. 4 reads "ODD." In some aspects, two different types of stabilization roller brackets may be provided. As explained above, the stabilization roller bracket 210 may space the roller from the inner surface of the movable barrier by different amounts (L1-L5) corresponding to the $1^{st}$, $3^{rd}$, $5^{th}$, $7^{th}$, and $9^{th}$ sections (the odd sections). A similar even stabilization roller bracket may be used for the $2^{nd}$, $4^{th}$, $6^{th}$, $8^{th}$, and $10^{th}$ sections (the even sections). Such a stabilization roller bracket would similarly include a main body, frangible portion, and two walls extending in a perpendicular direction on either side of the main body, as described with reference to the stabilization roller bracket 210. However, the holes of the walls would space the roller from the movable barrier by different distances. For example, a set of holes corresponding to the $2^{nd}$ section would space the roller from the movable barrier by a distance between the distances L1 and L2 shown in FIG. 5. Similarly, a set of holes corresponding to the $4^{th}$ section would space the roller from the movable barrier by a distance between the distances L2 and L3, and so on. In that regard, an installer of the movable barrier may need multiple odd stabilization brackets as well as multiple even stabilization brackets.

In some aspects, the stabilization roller bracket 210 may include all the holes necessary to be used at each section of the movable barrier by adjusting the holes of the walls 212 and 214 and including additional holes as needed.

The stabilization roller bracket 210 described herein provides several advantages over using two adjacent hinges to secure a long roller stem, as will be described with reference again to FIG. 3. Using the stabilization roller bracket 210 decreases the cost and weight of the movable barrier. In particular, because the stabilization roller bracket 210 includes less material than the hinge 200, the use of the stabilization roller bracket instead of an additional hinge decreases the cost and weight of the movable barrier. In addition, the stabilization roller bracket 210 is simpler than the hinge 200, with no rotating parts. The stabilization roller bracket 210 may be constructed of a single unitary piece of steel or other material, which further decreases the manufacturing cost of the stabilization roller bracket 210 in comparison to the hinge 200.

The stabilization roller bracket 210 also reduces the complexity of installation for movable barriers which include lites 250 as shown in FIG. 3. For example, if a second hinge is used in place of the stabilization roller bracket 210 in FIG. 3, the pointed top and bottom ends of the hinge will overlap the lites 250 of both sections 192A and 192B. As a result, before installation, an installer of moveable barrier will be required to cut off the top and bottom ends of the hinge to accommodate for the lites 250, which is a time-consuming process and typically requires specialized tools for cutting steel. Because the stabilization roller bracket 210 is only attached to one of the sections 192 (e.g., the section 192B), only one lite 250 (e.g., the lite 250 of section 192B) must be accommodated. In addition, the groove 216 which forms the frangible portion 312 of the stabilization roller bracket 210 makes removal of the lower end of the stabilization roller bracket 210 much simpler and does not require specialized tools.

The use of the stabilization roller bracket 210 also allows for the use of standard width endcaps 240, rather than double wide endcaps. A double wide endcap is typically used in conjunction with two adjacent hinges which both support a long roller. Just as the hinge 200 is positioned over the endcaps 240A and 240B in FIG. 3, a second hinge adjacent to the hinge 200 if it is used (in the position of the stabilization roller bracket 210 in FIG. 3) must also be positioned over the endcaps. In that regard, double wide endcaps are used. Double wide endcaps may extend from the edge of each section 192A and 192B to the line 242 shown. Double wide endcaps also contribute to increased cost and weight because more material is used. In addition, if double wide endcaps are used for a movable barrier including lites 250, the double wide endcaps will overlap with the lites 250 and will need to be cut. To illustrate this situation, regions 244 are shown in FIG. 3. For each lite 250 of the sections 192A and 192B, the lite 250 extends toward the edge such that a portion of the double wide endcap overlaps the lite 250 at the regions 244. As a result, the regions 244 of the double wide endcap must be removed. This region 244 must, therefore be removed by the installer before the double wide endcap may be attached to the movable barrier, which is a time-consuming process. The stabilization roller bracket 210, however, does not need to be placed over an endcap, but may be affixed directly to the movable barrier 190 In some aspects, the hinge 200 and its attachment to the endcap 192 is where most of the weight of the movable barrier is applied. In particular, when the weight of movable barrier or the amount of any other forces exerted on any of a single wide endcap, a single end hinge, or a short stem roller is exceeded, the bracket 210 provides additional support as well as the use of a long roller stem to increase the strength of the connection of the movable barrier to the tracks on either side of the movable barrier. In some aspects, the arrangement shown, including the bracket 210 increases strength because the longer roller stem helps to transfer load over a wider area along the movable barrier. This arrangement has been shown to be especially effective in testing. The increase of strength is also sufficient such that double-wide endcaps and double hinges are not necessary. In some aspects, the fin 230 (also referred to as a strut or ubar) may overlap the hinge 200 and the bracket 210 (FIG. 2B). This configuration provides additional strength and fastens the bracket 210 to the fin 230, thus providing a secure attachment method for the bracket 210.

Persons of ordinary skill in the art will appreciate that the implementations encompassed by the present disclosure are not limited to the particular exemplary implementations described above. In that regard, although illustrative implementations have been shown and described, a wide range of modification, change, combination, and substitution is contemplated in the foregoing disclosure. It is understood that such variations may be made to the foregoing without departing from the scope of the present disclosure. Accordingly, it is appropriate that the appended claims be construed broadly and in a manner consistent with the present disclosure.

What is claimed is:

1. A stabilization roller bracket for supplementing a hinge in coupling a roller to a movable barrier, comprising:

a base configured to be coupled to an inner surface of the movable barrier, the base comprising a main body and a frangible portion, the frangible portion comprising a screw hole therethrough, wherein in a first attached configuration, the frangible portion is configured to provide additional securement, and in a second removed configuration, the frangible portion is removed from the main body;

a first wall extending from the base and comprising a first plurality of stem-receiving holes, each of the first plurality of stem-receiving holes spaced a different distance from the base and configured to:

receive a portion of a stem of the roller of the movable barrier; and space the roller from the inner surface of the movable barrier.

2. The stabilization roller bracket of claim 1, wherein each stem-receiving hole of the first plurality of stem-receiving holes is configured to space the roller from the inner surface of the movable barrier by a different distance.

3. The stabilization roller bracket of claim 1, wherein the distance which each stem-receiving hole of the first plurality of stem-receiving holes spaces the roller from the inner surface of the movable barrier is determined based on a vertical position of the stabilization roller bracket along the movable barrier when the movable barrier is in a closed position.

4. The stabilization roller bracket of claim 1, further comprising:

a second wall comprising a second plurality of stem-receiving holes corresponding to the first plurality of stem-receiving holes and configured to receive a distal portion of the stem of the roller.

5. The stabilization roller bracket of claim 4, wherein the first wall and the second wall are perpendicular to the base of the stabilization roller bracket.

6. The stabilization roller bracket of claim 1, configured to be positioned between the inner surface of the movable barrier and a fin extending horizontally along the inner surface of the movable barrier and affixed to the inner surface of the movable barrier such that a portion of the fin overlaps a portion of the base of the stabilization roller bracket.

7. The stabilization roller bracket of claim 1, wherein the base of the stabilization roller bracket further comprises a groove separating the frangible portion and the main body, wherein the groove facilitates removal of the frangible portion.

8. The stabilization roller bracket of claim 7, wherein the frangible portion is removed if the movable barrier comprises a lite frame.

9. The stabilization roller bracket of claim 1, wherein the main body of the stabilization roller bracket further comprises an elongated hole allowing vertical adjustment of the stabilization roller bracket.

10. The stabilization roller bracket of claim 1, wherein one of the first plurality of stem-receiving holes is an elongated hole comprising more than one overlapping circular regions, each circular region configured to receive a distal portion of the stem of the roller and space the roller from the inner surface of the movable barrier by a different distance.

11. A movable barrier system, comprising:
- a movable barrier comprising an inner surface;
- a roller comprising a stem;
- a single wide endcap positioned over the end of the movable barrier and a portion of the inner surface;
- a first roller bracket comprising a hinge and an opening configured to receive a proximal region of the stem of the roller, the first roller bracket configured to be positioned over the single wide endcap; and
- a second roller bracket comprising:
  - a base configured to be coupled to the inner surface of the movable barrier; and
  - a first wall comprising a first plurality of holes configured to receive a distal region of the stem of the roller, wherein one hole of the first plurality of holes of the second roller bracket is aligned with the opening of the first roller bracket;
  - wherein the second roller bracket is shaped to attach to only one section of the movable barrier; and
  - wherein the second roller bracket is configured to be affixed to the inner surface, but not over the single wide endcap.

12. The movable barrier system of claim 11, wherein each hole of the first plurality of holes is configured to space the roller from the inner surface of the movable barrier by a different distance.

13. The movable barrier system of claim 11, wherein the first roller bracket further comprises a second wall comprising a second plurality of holes corresponding to the first plurality of holes and configured to receive the distal region of the stem of the roller.

14. The movable barrier system of claim 11, wherein the base of the second roller bracket comprises a groove defining a main body and a frangible portion.

15. The movable barrier system of claim 11, wherein the base of the first roller bracket further comprises an elongated hole allowing vertical adjustment of the first roller bracket.

16. The movable barrier system of claim 11, wherein one of the first plurality of holes is an elongated hole comprising more than one overlapping circular regions, each circular region configured to receive the distal region of the stem of the roller and space the roller from the inner surface of the movable barrier by a different distance.

17. The movable barrier system of claim 11, further comprising a second roller bracket configured to be affixed to the movable barrier at a different vertical position than the first roller bracket, the second roller bracket comprising:
- a second wall comprising a second plurality of holes, each of the second plurality of holes configured to space the roller a different distance from the inner surface of the movable barrier than each of the holes of the first plurality of holes.

18. A method of installing a movable barrier system, comprising:
- positioning a head of a roller within a track of the movable barrier system;
- positioning a stem of the roller through a tube of a first roller bracket, the first roller bracket comprising a hinge, and the first roller bracket being affixed to the movable barrier system over a single wide endcap;
- adjusting a vertical position of a second roller bracket positioned adjacent to the hinge, the second roller bracket comprising a plurality of holes, wherein adjusting the vertical position of the second roller bracket includes positioning the second roller bracket such that one of the plurality of holes is aligned with the tube of the first roller bracket, and wherein the second roller bracket is affixed to only one section of the movable barrier without being positioned over the single wide endcap; and
- positioning the stem of the roller through the aligned hole of the plurality of holes within the second roller bracket, such that a proximal region of the stem of the roller is positioned within the tube of the first roller bracket and a distal region of the stem of the roller is positioned within the aligned hole.

19. The method of claim 18, wherein the second roller bracket comprises a groove configured to facilitate removal of a portion of the second roller bracket, the method further comprising breaking off a portion of the second roller bracket.

* * * * *